Nov. 21, 1939.   F. W. DWYER   2,181,013
GAS TESTING DEVICE
Filed April 6, 1938   4 Sheets-Sheet 1
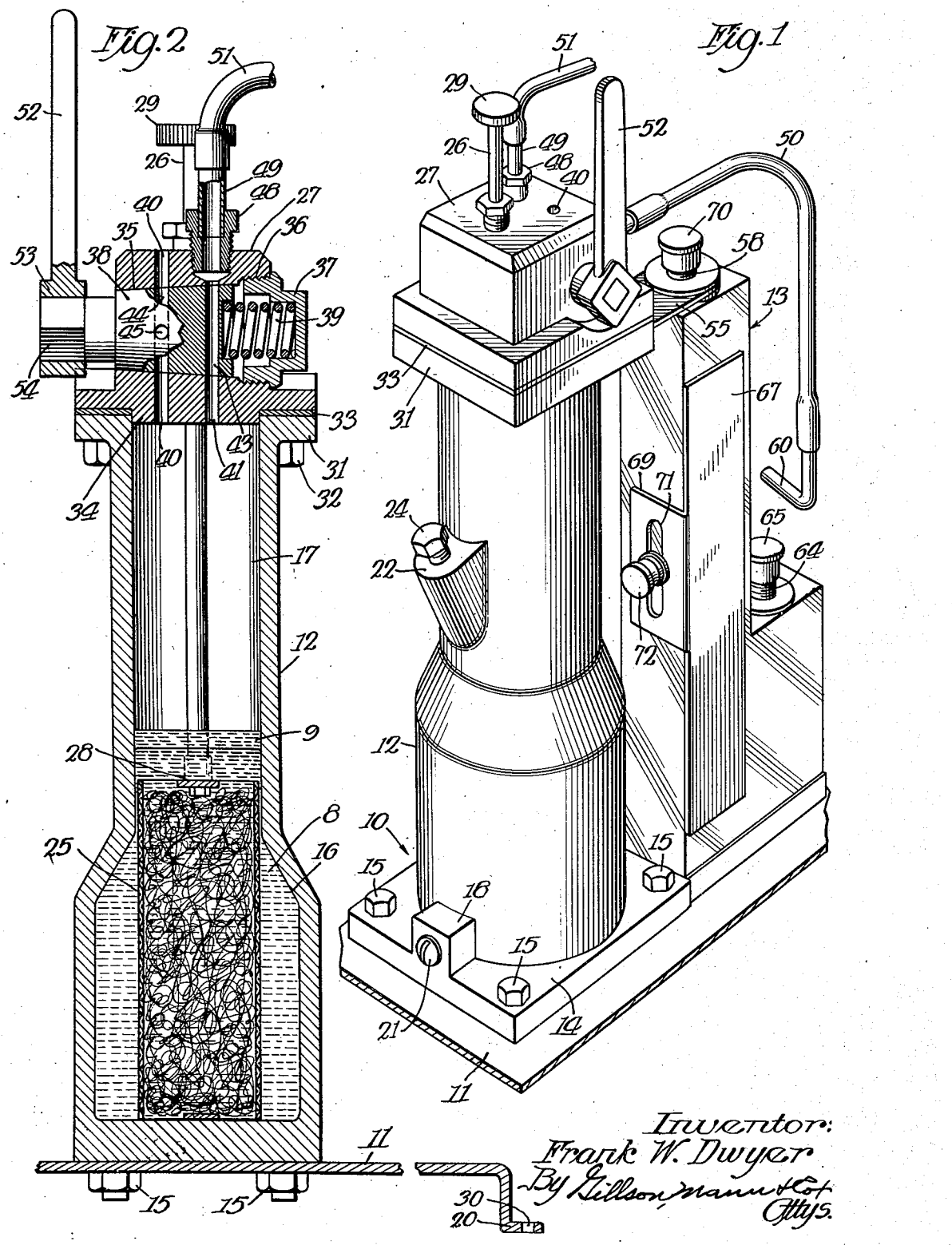
Inventor:
Frank W. Dwyer
By Gillson, Mann & Cot
Attys.

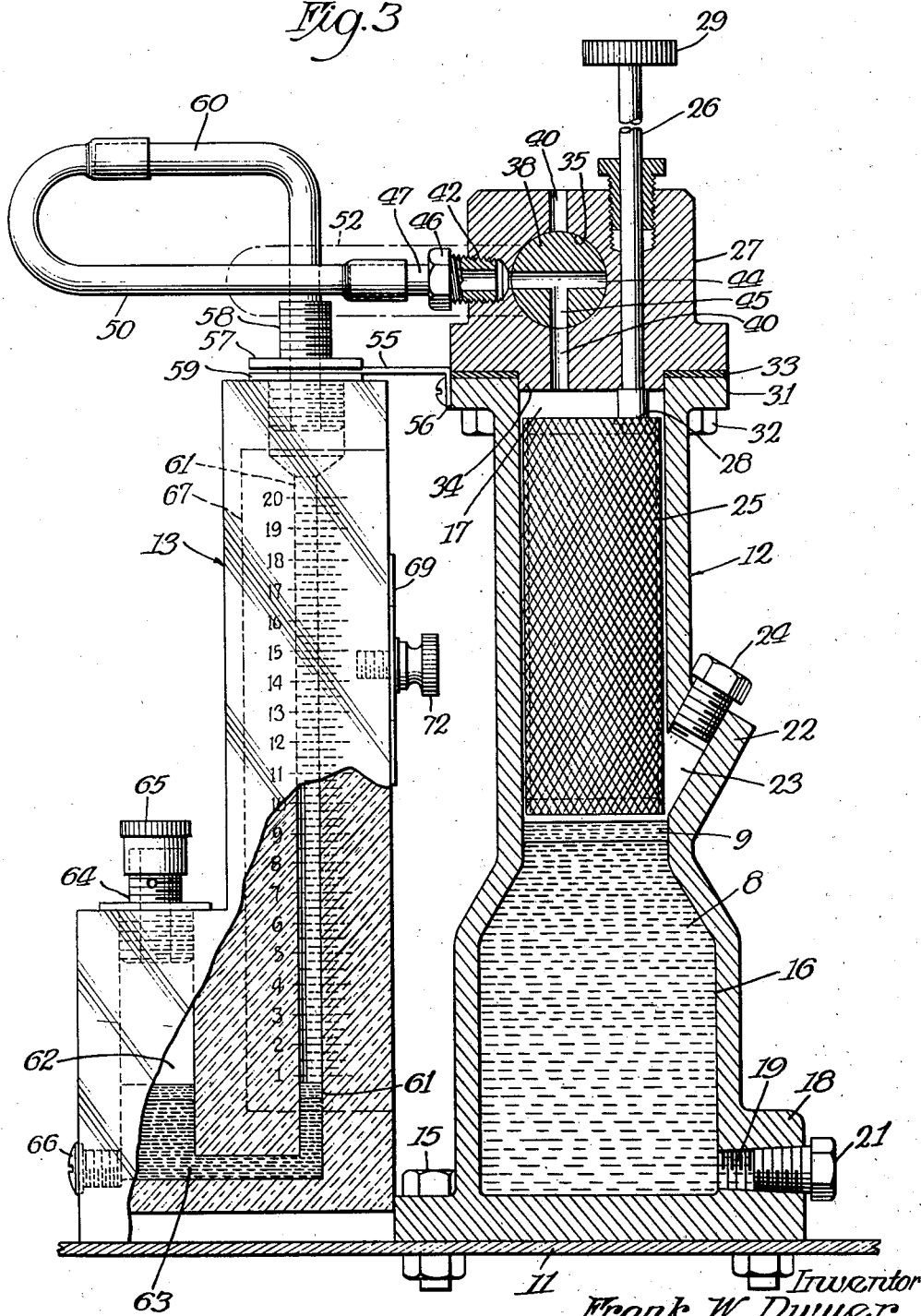

Nov. 21, 1939.   F. W. DWYER   2,181,013
GAS TESTING DEVICE
Filed April 6, 1938   4 Sheets-Sheet 3
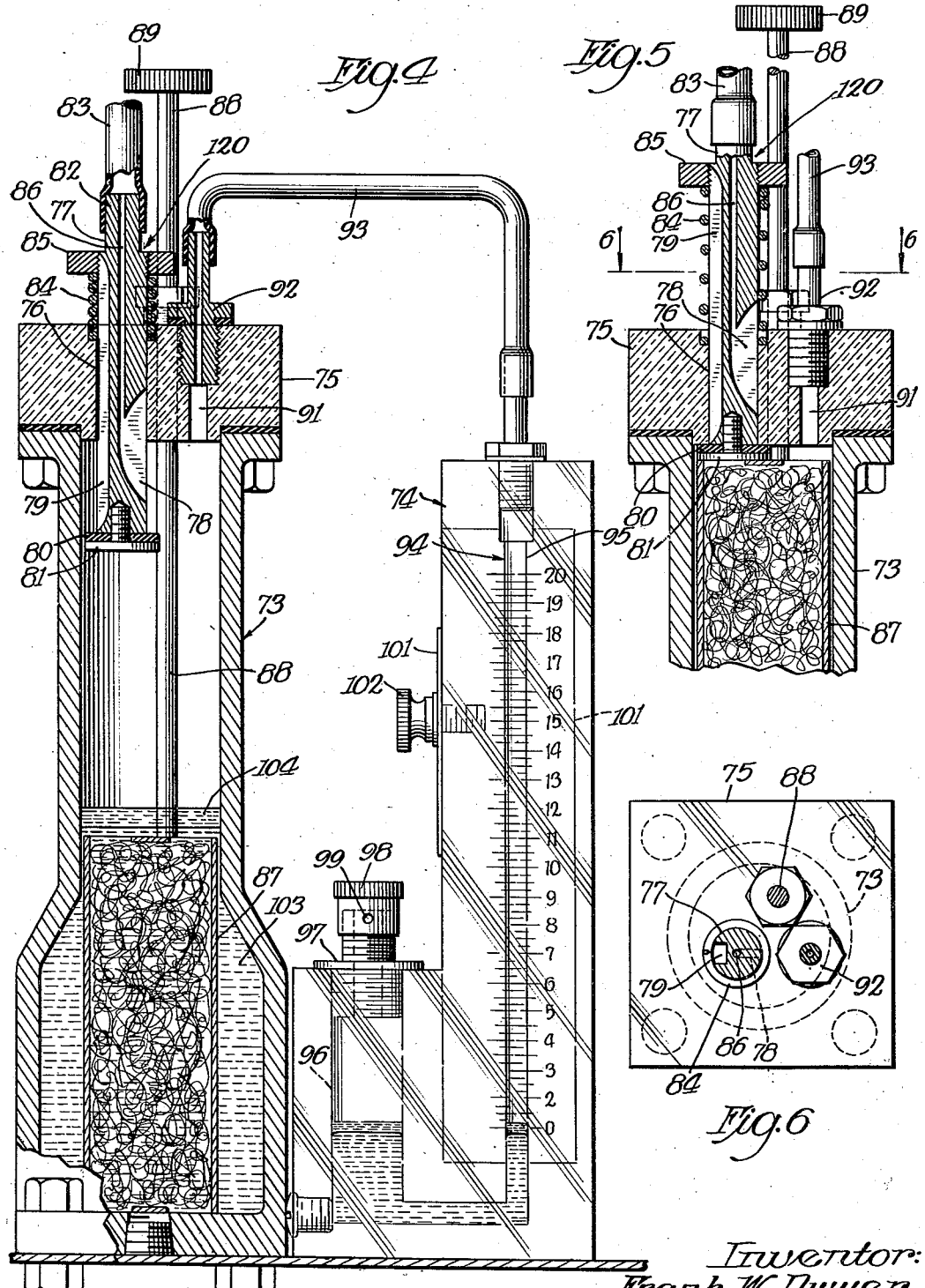
Inventor:
Frank W. Dwyer
By Gibson Mann ...
Attys.

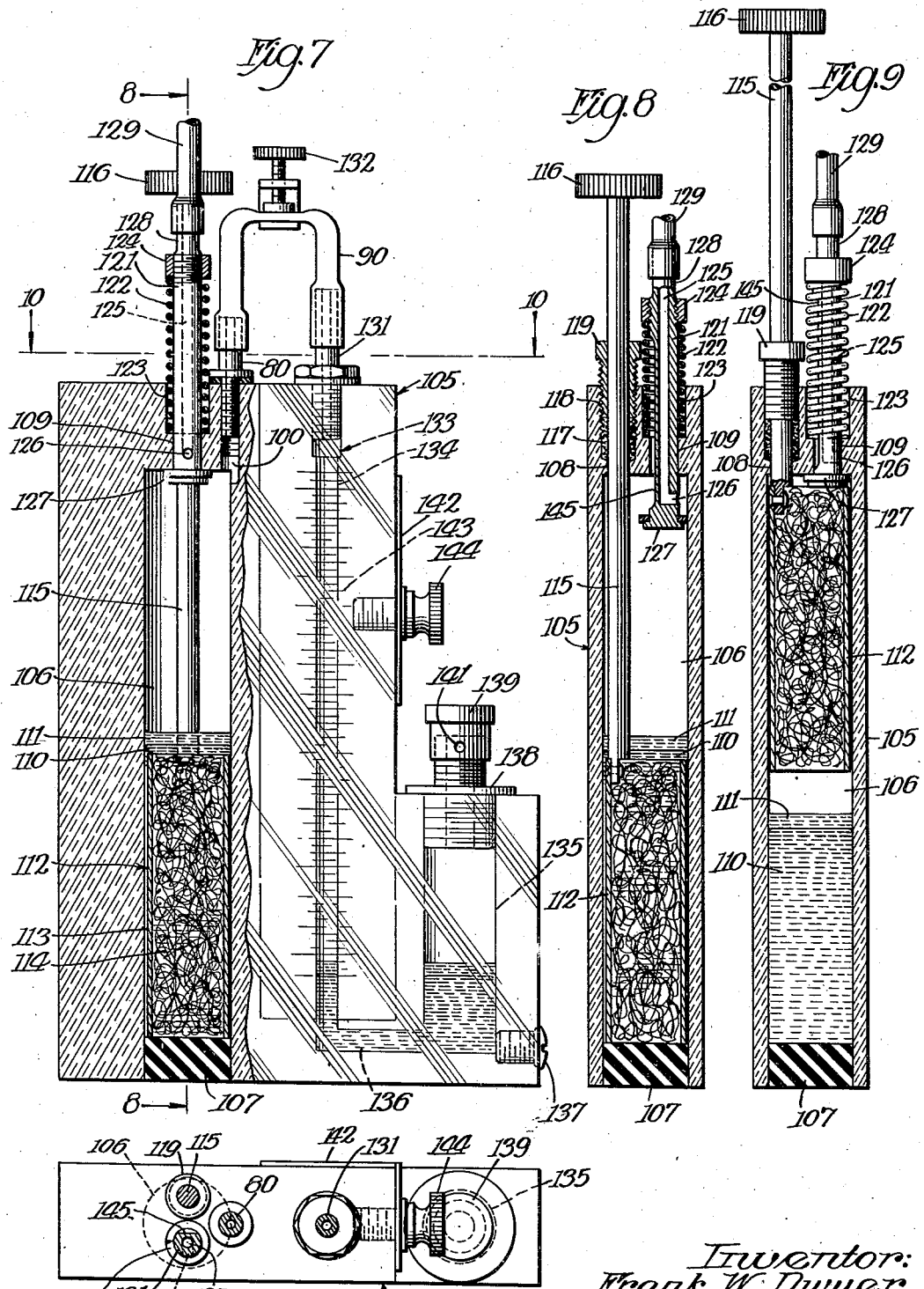

Patented Nov. 21, 1939

2,181,013

UNITED STATES PATENT OFFICE 2,181,013

GAS TESTING DEVICE

Frank W. Dwyer, Chicago, Ill.

Application April 6, 1938, Serial No. 200,294

17 Claims. (Cl. 23—254)

This invention relates to gas testing devices and more particularly to an apparatus for testing the proportionate amount of carbon dioxide gas contained in furnace gases and the like.

One of the objects of the invention is the provision of a new and improved gas tester that is so constructed that tests may be made without moving the device itself during the testing operation.

Another object of the invention is the provision of a new and improved gas testing device that is provided with novel means for causing an intermingling of the gas and testing chemical whereby the tests may be made in a minimum of time.

A further object of the invention is the provision of a new and improved device for determining the proportionate amount of carbon-dioxide gas in various gases that is provided with manually operated means whereby the device may be rendered safe for transportation or readily changed to gas testing condition in a few seconds of time.

A still further object of the invention is the provision of a new and improved gas testing device that is simple in construction, composed of a minimum number of parts, that is efficient and accurate in operation, light in weight, portable, and that is not likely to become deranged, broken or get out of order.

Other and further objects and advantages of the invention will appear from the following description taken in connection with the accompanying drawings, in which:

Fig. 1 is a perspective view of the device;

Fig. 2 is a transverse vertical section thereof;

Fig. 3 is a section of the gas mixing chamber taken at right angles to that shown in Fig. 2 and showing the gauge element partly in section, and with parts broken away;

Fig. 4 is a side elevation, with parts in section, of a modified form of construction, showing the valve and plunger in lowered positions;

Fig. 5 is a similar view but showing the valve and plunger in elevated positions, with parts in section and parts broken away;

Fig. 6 is a section on the line 6—6 of Fig. 5;

Fig. 7 is a side elevation of a further modified form of construction, with parts in section and parts broken away;

Fig. 8 is a section on the line 8—8 of Fig. 7 showing the valve and plunger in lowered positions;

Fig. 9 is a similar view but showing the valve and plunger in elevated positions; and Fig. 10 is a section on the line 10—10 of Fig. 7.

It is common practice in the construction of gas testing devices to so design the same that it is necessary, during the operation thereof, to invert or tilt the device, or at least that portion of it containing the reacting liquid. The present invention seeks to simplify such construction by the provision of an apparatus provided with a liquid reagent reservoir and having a light weight, easily operated element having an extended surface for effecting the necessary intermingling of the gas and liquid to effect the proper reaction and that is easily manipulated by the operator without moving the testing device of the liquid reservoir.

Referring now to the drawings, the reference character 10 designates the gas testing device which comprises a base 11 on which is mounted a gauge device 13 and a receptacle 12 for containing the reaction composition. The base 11 is provided with flanges 20, Fig. 2, forming feet having apertures 30 for receiving bolts or screws for attachment to a table or other support, if desired.

The receptacle 12 is provided with a base having a flange 14 which is adapted to be secured to the base 11 as by means of suitable bolts 15. This receptacle is provided with a chamber 16 for containing a liquid capable of reacting on $CO_2$ gas such as a caustic solution on which floats a layer of neutral liquid such as oil. The upper portion 17 of the chamber may be restricted and has its sides parallel as shown more clearly in Fig. 3 of the drawings.

The base 14 has an enlargement as at 18 which is provided with a threaded opening 19, Fig. 3, adapted to be closed by a plug 21. The threaded opening 19 affords a passage for draining or removing the liquid from the chamber 16, when so desired.

The side wall of the upper portion of the receptacle is provided with an enlargement at 22 which has a downwardly and inwardly extending opening 23 threaded at its upper end and a plug 24 is adapted to engage therein for closing the opening. The opening permits the introduction of the desired liquids into the chamber 16.

Mounted to reciprocate within the chamber 16 is a plunger 25 whose cross-sectional area is but slightly less than the cross-sectional area of the restricted portion 17 of the chamber 16 so that when it is elevated, the gas above it will be forced through and not around it. This plunger may be of any suitable material forming a porous mass or a mass having interstices therein, that is, a mass having a large exposed surface. Preferably, the plunger is of alkali-proof reticulated material. In the form shown, the plunger is of wire cloth of fine mesh or of other material not seriously affected by the caustic solution used in the device, such as iron or the like. This cloth may form a cylinder filled with fibrous material such as steel wool or the like. This plunger is adapted to be lowered into the enlarged portion of the chamber below the layer of oil 9 and raised into the restricted portion thereof above said oil by any suitable means such as the rod 26 which extends through an opening in the head or cap 27 of the receptacle and is rigidly attached to the upper end of the plunger 25 as at 28. The upper end of the rod 26 may be provided with a knurled handle 29 for raising and lowering the plunger 25.

The upper end of the receptacle is provided with an outwardly extending flange 31 which extends about the same. A head or cap 27 is secured to the flange 31 as by means of bolts 32, Fig. 3. A suitable gasket 33 is mounted between the cap 27 and the flange 31 so as to form an air-tight joint. The cap 27 is provided on its lower surface with a depending portion 34 which is adapted to enter the upper end of the reduced portion of the chamber 17 for positioning the head or cap 27 thereon.

Suitable passages are provided for conducting the gas to be tested to and from the chamber 16 and also for placing the chamber 16 in communication with the gauge 13 as will now be described. A tapered opening 35, Fig. 2, extends horizontally through the head 27 and has its enlarged end screw threaded as at 36 for receiving an internally threaded cap 37 as shown in Fig. 2. A tapered valve member 38 is mounted in the opening 35 and a spring 39, seating in the cap 37 and in a recess in the outer end of the valve 38, resiliently forces the valve outwardly so as to always insure a tight joint.

The head 27 is provided with a pair of vertically extending bores 40 and 41 which extend downwardly through the opening 35 in the central vertical plane thereof. The bores 40 and 41 extend vertically through the head into the chamber 16. The head 27 is also provided with a threaded passage 42, Fig. 3, which extends horizontally from the bore 35 to the exterior of the head.

The valve 38 is provided with a bore 43, Fig. 2, which is adapted to be aligned with the bore 41 and with a bore 44 which is adapted to be brought into alignment with the bore 40 when the bores 41 and 43 are in alignment. The valve 38 is also provided with a passage 45, Fig. 3, which extends from the circumference of the valve inwardly and intercepts the bore 44. The passage 45 is adapted to be brought into register with the threaded opening 42 or with the bore 40, as will presently appear.

The threaded opening 42 is provided with an apertured connector plug 46 to which a connector pipe 47 is attached. A flexible tube 50 is adapted to be attached to the outer end of the connector member 47 and has its free end provided with a connector tube 60 and which is adapted to be attached to the gauge, as will presently appear.

The bore 41 is counterbored at its upper end and threaded for receiving an apertured plug or connector member 48 to which a connector tube 49 is attached, as shown in Fig. 2. Attached to the tube 49 is a flexible tube 51 through which the gas is conveyed to the chamber 16 when the same is to be tested. The valve 38 is adapted to be turned to the position shown in Fig. 2 to convey gas to be tested into the chamber 16 and for conveying the same into the atmosphere through the passage 40 and may also be turned into position at right angles thereto as shown by dotted lines in Fig. 3 in which the outer end of the bores 40 and 41 will be closed and the bores 40, 44, 45 will place the chamber 16 in communication with the gauge 13 through the flexible tube 50, as shown in Fig. 3 of the drawings. The valve 38 may also be turned to an intermediate position where the lower portions of the bores 40 and 41 will be closed.

Any suitable means may be provided for turning the valve. In the form of the construction shown, the outer end of the valve 38 is squared and a handle 52 having an angular socket 53 therein may be provided for engaging the squared shank 54 of the valve, see Fig. 2.

A gauge 13 is also mounted on the base 11 in proximity to the receptacle 12 and is held in position thereon by a plate 55, Fig. 3, having a flange 56 which is rigidly secured to the flange 31 of the receptacle 12 as clearly shown in Fig. 3 of the drawings. The outer end of the plate 55 is clamped to the upper end of the gauge by a nut 57 on the nipple 58. The nipple 58 extends through the plate 55 and is threaded into a plug 59 which in turn is threaded into the upper end of the gauge 13.

The gauge 13 comprises a block of suitable transparent material, various types of which are on the market. This block is provided with a uniform bore 61 extending vertically and in alignment with the aperture in the plug 59. The bore 61 extends to the lower portion of the block and then extends laterally outwardly and then upwardly as at 62 to form a U-tube which is adapted to contain a liquid 63 for indicating the pressure. The liquid 63 is adapted to extend upwardly in the bores 61 and 62. The bore 62 is of considerably larger diameter than the bore 61 so that a minimum movement of the level of the liquid in the bore 62 will result in a comparatively large movement of the liquid in the smaller bore 61. The liquid may be of any suitable material, such as mercury, having a small amount of colored liquid above the same for indicating its height or it may be of some suitable colored liquid.

The upper end of the bore 62 is provided with an apertured plug 64 which is adapted to be closed by a cap 65 for closing the upper end of the tube 62 when the device is not in use. In constructing the gauge, the bore 62 is drilled from above, the connecting portion of the two legs is drilled from the side and the outer end of the bore closed as by means of a plug 66 as shown in Fig. 3. The bore 61, of course, is drilled from above and is counter-bored to receive the plug 59. The connector 60 is adapted to be attached to the plug 59 by pushing the same downwardly therein as shown in Fig. 3.

Calibrations are provided on the inner face of a plate 67 secured to the block and may be read through the gauge block as indicated in Fig. 3. The plate is provided with a lateral flange 69, Fig. 1, having an elongated opening 71 therein through which the set screw 72 extends into the gauge block. The slot 71 permits the calibrated plate to be raised or lowered so as to properly adjust the same to the zero mark before taking the reading.

The larger portion of the chamber 16 is filled with a caustic solution 8 such as potassium or sodium hydroxide and a layer of oil 9 is introduced which floats on the surface of the liquid and protects the same from contact with gas in the chamber above the oil level. The caustic solution and the oil are introduced through the passage 23.

In the operation of the device, the cap 70 on the nipple 58 of the gauge 13 is removed and the connector 60 inserted in the nipple. The cap 65 is unscrewed to permit air to enter the tube 62. The handle 52 is turned to its upright position as shown in Fig. 2. The plunger 25, if not already in its lowered position, is lowered to the position shown in said figure and tube 51 is placed in communication with the gas to be tested. The gas passes down through the tube 51 into the upper portion of the chamber 16 and to the atmosphere through the passages 40, 44. After the gas has passed through the chamber for a sufficient length of time to insure that all the air has been forced out of the chamber, the handle 52 is turned to the dotted line position shown in Fig. 3 which will close the upper ends of both the bores 40 and 41, after which the handle 29 is raised carrying with it the plunger 25 into the upper end of the chamber 16 partially or entirely above the oil level, as shown in Fig. 3 of the drawings, for exposing the caustic solution to the gas. The carbonic acid gas contained in the chamber will be reacted on by the caustic solution thereby decreasing the pressure which may then, after the plunger has been lowered, be read directly on the scale. The plunger 25 may be raised and lowered, if desired, several times until the reading is constant.

After the plunger 25 is lowered and the reading made, the handle 52 is turned to the position shown in Fig. 2 to permit air to enter the chamber 16, the connector 60 is removed and after the pressure in the two arms of the gauge has become equalized, the cap 70 is placed on the nipple 58 and the cap 65 screwed down to prevent escape of the liquid in the gauge. The handle 52 is now turned through 135 degrees or one-eighth of a turn downward from the position shown in Fig. 3 for closing all of the passages 40, 41 and 45. The device is then ready for transporting to other places to make additional or further tests.

In Figs. 4 to 6 is shown a modified form of construction. In this form of the device, the receptacle 73 and the gauge 74 are substantially the same as that already described. The receptacle 73 is provided with a head 75 which may be of any suitable material, that shown being transparent and having a vertical bore 76 in which is slidably mounted a valve 120. The valve 120 comprises a stem 77 and a valve head 81. The valve stem 77 has a curved recess 78 in communication with an axial bore 86 in the stem. The stem also has a channel 79 on another side for conducting gas from the receptacle 73 as will presently appear.

The valve head 81, having the gasket 80, is secured to the lower end of the valve stem 77 and is adapted to close the opening 76 when the valve is at its upper limit of movement. The upper end of the valve stem is reduced to form a nipple 82 to which is adapted to be attached a tube 83 which may be of rubber or the like for conducting the gas to be tested to the receptacle 73. A spring 84 is seated in a recess in the cap 75 and abuts against a nut 85 secured to the upper threaded end of the valve stem 77 as shown in Fig. 4 of the drawings. The spring normally holds the valve 81 in closed position for preventing the passage of gas into or out of the receptacle 73. When the valve is in lowered position, as shown in Fig. 4, gas may enter through the tube 83 and a passage 86 in the stem 77 and escape through the curved recess 78 into the interior of the receptacle. The gas in the receptacle may pass outwardly through the channel or recess 79 to the atmosphere.

A plunger 87, corresponding to the plunger 25 already described, is provided for the receptacle 73. This plunger, in the form of construction shown, fits fairly snugly in the upper portion of the receptacle and is provided with a stem 88 extending through the head 75 and terminating in a button 89 by means of which the cylinder 87 may be raised and lowered as in the previous construction.

The head 75 is provided with a passage or bore 91 through which the pressure in the receptacle and gauge are equalized when gas is absorbed by the caustic solution. A nipple member 92 is secured in a counterbore in the outer end of the passage 91 and is adapted to have secured thereto a tube 93 of rubber or the like for conducting the gas to the gauge as will presently appear.

The gauge 74 is of transparent material such, for instance, as Celluloid, or plastic condensation products such as Bakelite, phthalic anhydride, urea condensation product, and the like. It is provided with a U-shaped bore 94 having a long arm 95 and a short arm 96, the short arm 96 being of very much larger diameter than the arm 95 so that the level of the liquid therein will have a much smaller travel than that in the arm 95. The upper end of the arm 96 of the bore 94 has a threaded nipple 97 provided with a cap 98. The cap 98 is provided with an opening 99 through which air may pass when the cap 98 is partially unscrewed. The upper extension of the gauge is provided with an indicator plate 101 with a suitable scale thereon for indicating the height of the liquid level in the long arm 95 and consequently the amount of $CO_2$ gas in the tested sample. The plate 101 may be adjusted along the gauge for properly setting the scale at zero by a thumb nut 102 in the usual manner.

The receptacle 73 is partially filled with a caustic liquid 103 as in the previous construction and on which is a layer of oil 104 as previously described.

In the operation of the device, the valve 120 is lowered by pushing downwardly on the nut 85, which is large enough to constitute a knob or handle, and the gas to be tested is pumped through the tube 83 and passages 86 into the interior of the receptacle 73 and forces the air therein out through the passage 79. This valve is held in lowered position until the receptacle contains only the gas to be tested, that is, until the air has all been displaced by this gas. The layer of oil 104 will separate this gas from the caustic liquid 103 and consequently no chemical reaction occurs during the filling of the receptacle with the gas. The valve stem is now released to permit the valve 81 to rise and close the passage 76. The cap 98 is released to permit air to enter the short tube 96. The cylinder 87 is now elevated and the caustic solution adhering to the cylinder and to the steel wool contained therein will react on the carbon dioxide contained in the gas thereby reducing the pressure in the receptacle and the air pressure on the mercury column being greater in the short arm 96 will force the level of the mercury in the long arm 95 upward whereby the percentage decrease in volume of gas sample may be read on the scale through the transparent material of the gauge.

In Figs. 7 to 10 is shown a further modified form of construction. In the use of carbon dioxide indicators, it is sometimes desirable that a small pocket size form of the construction be provided due to its convenience in using and transporting the same. In this form of construction, the entire device, may be, and preferably is, constructed from a single block of material. Any suitable material may be employed, that shown being of transparent material such as Celluloid, or plastic condensation products such as Bakelite, phthalic anhydride, urea condensation product, and the like.

In the form of the construction selected to illustrate one embodiment of this form of the device, the block of transparent material 105 is provided with a bore 106 which constitutes the receptacle for holding the caustic material. The bore forming this receptacle is drilled from the bottom and extends to a point adjacent to the top of the block. The lower end of the bore is closed by any suitable means as by a rubber plug 107 and three small bores 108, 109 and 109 extend into the bore 106 from the top of the block.

The bore 106 is adapted to contain a caustic liquid 110 on top of which floats a layer of oil 111. Within the bore 106 is mounted a plunger 112 comprising the outer cylindrical reticulated portion 113 which contains porous material or material having interstices therein such as steel wool 114 or the like for increasing the surface of the material as in the previous construction.

The plunger 112, Fig. 8, has attached thereto a stem 115 which extends upwardly through the bore 108 and has an operating button 116 on its upper end. Suitable packing 117 extends about the valve stem 115 in a counterbore 118 of the bore 108. A screw gland 119 threaded in the counterbore 118 is employed for applying pressure to the packing or gland 117 to form an air-tight joint at that point.

Mounted within the bore 109 is a slidable valve stem 121 which is surrounded by a spring 122 seated in a counterbore 123 in the upper end of the block 105 and having a bearing against the nut 124 on the upper end of the stem 121. The stem 121 has an axial passage 125 extending downward to a point adjacent its lower end whereby the passage turns laterally as at 126, shown more clearly in Fig. 8 of the drawings. A valve 127 is mounted on the lower end of the stem 121 and is adapted to close the opening 109 when the valve is in its upper position. The spring 122 tends to hold the valve in closed position and in such position the passage 125 is closed. The upper end of the valve stem 121 is provided with a nipple 128 to which a tube 129 of rubber or the like, leading to the pump or fan for delivering the gas to be tested to the receptacle, is attached.

The bore 108 has a nipple 89 secured therein and a tube 90 is secured to this nipple. The other end of the tube 90 is connected to a nipple 131 secured in the long arm of the U-shaped tube of the gauge as will presently appear. A suitable clamp 132 may be provided for closing the passage through the tube 90 in a conventional manner.

The block 105 is also provided with a U-shaped passage or bore 133. The bore 133 comprises a long arm 134 of small diameter, a large arm 135 of large diameter and a connecting portion 136 which may be of substantially the same diameter as the bore 134. The bores 133 and 135 are adapted to be drilled from the top of the block and the connecting bore 136 from the side thereof. The outer end of the bore 136 may be closed by a plug 137, as shown more clearly in Fig. 7 of the drawings. The upper end of the enlarged bore 135 is provided with a threaded nipple 138 which is adapted to be closed by a threaded cap 139. The cap 139 is provided with an opening 141 in one side thereof so that when the cap is partially unscrewed, air may pass through the opening 141 into the bore 135. The upper end of the bore 133 is provided with a nipple 131 for attachment to the tube 90 as previously described.

A scale or angular metal plate 142 having graduations 143 thereon is adapted to be adjustably secured to the block 105 by means of a set screw 144 in such a position that the graduations can be seen and read through the transparent block 105.

The valve stem 121 is provided with a groove 145 which terminates above the valve 127 but extends longitudinally of the stem to the exterior of the block whereby when the valve is depressed, air or gas within the bore 106 is free to escape through the passage 109.

In the operation of the device, assuming that the parts are in the position shown in Fig. 7 and that the cap 139 and the clamp 132 are released, the valve stem 121 is depressed and gas entering through 129 is forced into the bore 106 to displace the air therein. The valve stem 121 is then released so that the valve 115 will close the passage 108 and the gauge set at zero after which the plunger 112 is elevated by lifting on the stem 115. The chemical reaction of the caustic liquid on the carbon dioxide of the gas sample will lower the pressure in the bore 106 and this will be indicated by the level of the mercury in the long arm 134 of the bore 133. The reading is taken after the plunger is lowered.

It will be noted that in all forms of the device, a plunger is employed for bringing the caustic solution and gas into contacting relation. This plunger may be of any suitable material that is resistant to the action of the caustic solution.

In the form of the construction shown in Figs. 1 and 2, a rotary valve is employed through which the $CO_2$ gas is introduced into the chamber. In the remaining figures are shown two other forms of the device, both of which employ sliding valves for admitting and discharging gas from the gas chamber. The use of a slide valve is preferred over the rotary valve because with the rotary type of valve, the caustic tends to destroy the lubricant and the water in the solution tends to cause rusting of the rotary valve thereby rendering the same difficult to turn but with the slide from the stem may be made small enough to provide adequate clearance. When the valve is sealed, the stem is protected from contact with the caustic and consequently, the valve is easily operated and does not stick.

While in the form of constructions shown in Figs. 1 to 6, the chamber containing the caustic solution has the lower portion enlarged, this is done merely to increase the capacity of the portion containing the solution. This chamber may be uniform in cross-section throughout its length as shown in Figs. 7 to 9.

It is thought from the foregoing taken in connection with the accompanying drawings, that the construction and operation of my device will be apparent to those skilled in the art and that changes in size, shape and proportion may be made without departing from the spirit and scope of the appended claims.

I claim as my invention:

1. A portable gas testing device comprising a casing having a reservoir, a caustic solution in the lower portion of the reservoir, a porous plunger movable only in a linear path, manual means for depressing said plunger into said solution for saturating the same and for elevating the same into the upper portion of said reservoir above said solution, a pressure gauge element, and means for placing said reservoir in communication with the gas to be tested or with said gauge element.

2. A portable gas testing device comprising a casing provided with a reservoir having its upper portion reduced in cross-section, a caustic solution in the lower portion of said reservoir and having its level in the lower part of said reduced portion, a layer of neutral liquid in said receptacle above said level, a porous plunger of slightly less cross-sectional area than said reduced portion, an air pressure gauge, manual means for lowering said plunger into the lower portion of said reservoir and elevating the same in a linear path into the reduced portion thereof, means for conducting gas to be detected through said reservoir, and means for placing said reservoir into communication with said gauge.

3. In a portable gas tester, a receptacle comprising a chamber partly filled with a caustic solution and having a layer of oil on its upper surface, a roll of fibrous material of fine mesh immersed in said solution beneath the layer of oil, means for introducing a gas into said chamber, said gas having a constituent capable of reacting on said solution, manual means for elevating said roll in a linear path, a pressure gauge, and means for placing said chamber in communication with said gauge.

4. In a gas tester, a receptacle having a chamber for containing a caustic solution with a layer of oil thereon, a plunger of reticulated causticproof material movably mounted in said chamber, manual means for moving said plunger in a linear path out of contact with said solution, said receptacle having a cap provided with a plurality of passages for conducting air and $CO_2$ gas to and from said chamber, a valve having passages therein, a pressure gauge, and means including a handle for turning said valve for placing said chamber in communication with the passage for conducting gas to be tested to said chamber, in communication with the atmosphere or in communication with said gauge alone.

5. In a gas tester, a receptacle having a chamber therein, a cap for closing the upper end of said chamber, said cap having two vertical passages therethrough for conducting gas into and out of said chamber, a valve intercepting said openings, a lateral passage extending laterally from said valve to the side of said cap, a pressure gauge, a conduit in communication with said lateral passage and said gauge, a conduit connected to one of said vertical passages for conducting gas to be tested to said chamber, said valve having two bores therethrough adapted to register with said vertical passages and having a lateral passage from one of said bores adapted to register with said lateral passage, means for turning said valve to one position for conducting gas into and out of said chamber and to a second position to close said vertical passages and opening said lateral passage to place said chamber in communication with said gauge, said means being adapted to turn said valve to a third position to close all of said passages, a vertically movable plunger of wire cloth within said chamber, and manually operated means for raising and lowering said plunger in a linear path.

6. In a gas testing apparatus, a receptacle having a chamber, said chamber being enlarged at its lower end and restricted at its upper end and containing a caustic solution, the level of which is adjacent to, but above, the level of said enlarged portion, a layer of oil on said solution, a plunger of wire cloth immersed in said solution, manually operated means for raising said plunger vertically in a linear path above the level of said solution and for lowering said plunger below the level of said solution, means for conducting gas to be tested through passages into and out of said chamber while said plunger is immersed in said solution, means for closing said passages, and means for measuring the reduction in pressure within said chamber due to the reaction of said gas on said solution.

7. In a gas testing apparatus, a receptacle, a caustic solution in one portion of said receptacle, a plunger comprising a porous mass of material, means for reciprocating said mass vertically in a linear path into and out of contact with said caustic solution in said chamber, a gauge in communication with the upper portion of said chamber for indicating gas pressure therein, and a valve for introducing gas to be tested into said chamber.

8. In a gas testing apparatus, a receptacle, a caustic solution in said receptacle, a layer of neutral liquid on said solution, a pressure gauge, means for placing said gauge in communication with said receptacle, a valve for admitting and permitting discharge of gas from said receptacle, a plunger comprising a porous mass in said receptacle, and manually operated means for reciprocating said mass in a linear path below the level of said liquid and to a position for exposing said mass to gas contained in said receptacle.

9. In a gas testing apparatus, a receptacle, a caustic solution in one portion of said receptacle, a layer of neutral liquid in said solution, a plunger comprising a porous mass of material, manually operated means for reciprocating said mass in a linear path into and out of contact with said caustic solution in said chamber, a gauge in communication with the upper portion of said chamber for indicating gas pressure therein, a valve for introducing gas to be tested into said chamber, said gauge comprising a U-shaped passage in communication with the air at one end and with said receptacle at the other, a liquid in said passage, a graduated indicator plate, and means for adjustably mounting said plate on said gauge, said plate being so graduated and adjusted on said gauge as to indicate the percentage of $CO_2$ gas in a given sample.

10. In a gas testing apparatus, a chamber for holding a caustic solution, means for introducing gas to be tested into said chamber, said means comprising a slidable valve stem movable in a linear path and having passages leading into and out of said chamber, means for intermingling said gas and solution, a valve carried by said stem for preventing discharge of gas from said chamber when said valve is closed, and means for measuring the amount of gas absorbed by said solution.

11. In a gas testing apparatus, a receptacle for containing a caustic solution, said receptacle having a passage, a valve having a stem slidably mounted in said passage and a head for closing said passage, said stem having an axial bore for admitting gas to said receptacle for testing the percentage of $CO_2$ gas therein, said bore terminating at the periphery of said stem outwardly of said head, said stem also having a passage extending to the exterior of said receptacle and terminating outwardly of, but adjacent to, said head, whereby when said valve is at its inner position, gas may enter said bore and gas in said receptacle escape through said second-named passage, spring means for normally closing said valve, means for mixing said $CO_2$ gas and caustic solution, and means for indicating the amount of $CO_2$ absorbed by said solution.

12. A gas testing apparatus comprising a solid block of transparent material having a body portion and an offset, said body portion having a bore extending upwardly from its lower side for forming a liquid containing receptacle, said body portion and offset having a U-shaped passage therein forming a pressure gauge having a long arm, a short arm and a connecting portion, said short arm being of greater diameter than the long arm, said passage being filled with a heavy liquid, said long arm being in communication with said bore, a graduated scale adjustably mounted on said block rearwardly of said long arm with the graduations visible through the block, a caustic solution with a top layer of neutral liquid within said receptacle, a plunger having interstices therein movable to a position beneath the surface of said neutral liquid and to a position at least partially above said liquid, manually operated means for raising and lowering said plunger in a linear path, a slidable valve for admitting gas to be tested to said receptacle, said valve comprising a head and a stem, said stem having a bore and a passage extending to the exterior of said receptacle and terminating on the periphery of said stem adjacent to said head, and a spring for normally holding said valve head in closed position.

13. A small portable gas testing apparatus comprising a block of transparent material having a caustic solution container therein, a pressure gauge therein, means for placing said gauge and receptacle in communication, means including a single sliding valve for admitting gas into and permitting its discharge from said receptacle, means for intermixing said gas and solution and a graduated scale for indicating the percentage of carbon dioxide gas in a given sample of gas introduced through said valve.

14. In a gas testing apparatus, a solid block of transparent material having a vertical bore therein opening at the bottom and forming a receptacle for containing a caustic solution, a caustic solution in said receptacle, a layer of neutral liquid on said solution, a closure for said receptacle, a U-shaped bore in said block and having a long and a short arm opening upwardly, a liquid in said arms, a passage leading from said receptacle to the exterior of said block, a single slidable valve in said passage for the admission of gas to said receptacle and the discharge therefrom, means for causing intermingling of said gas and said caustic solution, means for placing said long arm in communication with said receptacle, and a graduated scale on said block adapted to be adjusted thereon to bring a predetermined marking at the level of the liquid in said gauge when the liquid is of the same level in both arms.

15. In a gas testing apparatus, a chamber for holding a caustic solution, means for introducing gas to be tested into said chamber, said means comprising a slidable valve stem movable in a linear path and having passages leading into and out of said chamber, said passages being opened when said valve is moved to its innermost position and closed when said valve is moved to its outermost position for trapping a predetermined sample of gas to be tested, means for causing said gas and solution to contact each other, and means for indicating the relative amount of gas absorbed by said solution.

16. In a gas testing apparatus, a chamber for containing a caustic solution, means for introducing gas to be tested into said chamber, said means comprising a valve stem having a rectilinear movement and provided with inlet and outlet passages for introducing and discharging gas from said chamber, means for separating said gas from said solution while said gas is being introduced into said chamber, means for effecting contact between said gas and solution, and means for indicating the relative amount of gas absorbed.

17. In a gas testing apparatus, a chamber for containing a caustic solution, means including a slidable valve stem movable in a linear path and having inlet and outlet passages for conducting gas to said chamber when said valve stem is depressed, means for elevating said stem for promptly closing said passages when said stem is released for trapping a predetermined quantity of gas in said chamber, means for separating said gas from said solution while said gas is being introduced into said chamber, means for effecting contact between said gas and solution, and means for indicating the relative amount of gas absorbed.

FRANK W. DWYER.